United States Patent
Gorajala Chandra

(10) Patent No.: US 12,225,028 B2
(45) Date of Patent: Feb. 11, 2025

(54) AI (ARTIFICIAL INTELLIGENCE) DRIVEN DYNAMIC SELF-REMEDIATION FOR WIRELESS NETWORKS BY DISPATCHING ROBOTS

(71) Applicant: Fortinet, Inc., Sunnyvale, CA (US)

(72) Inventor: Sekhar Sumanth Gorajala Chandra, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 206 days.

(21) Appl. No.: 17/710,739

(22) Filed: Mar. 31, 2022

(65) Prior Publication Data
US 2023/0319080 A1   Oct. 5, 2023

(51) Int. Cl.
*H04L 9/40* (2022.01)
(52) U.S. Cl.
CPC .......... *H04L 63/1425* (2013.01); *H04L 63/02* (2013.01); *H04L 63/1416* (2013.01); *H04L 63/168* (2013.01)
(58) Field of Classification Search
CPC .................. H04L 63/1425; H04L 63/1416
See application file for complete search history.

(56) References Cited

U.S. PATENT DOCUMENTS

| | | | | |
|---|---|---|---|---|
| 8,365,009 B2* | 1/2013 | Dournov | ............... | G06F 11/203 714/4.11 |
| 2019/0098043 A1* | 3/2019 | Banerjee | ............... | G06N 20/00 |
| 2020/0285737 A1* | 9/2020 | Kraus | ............... | G06F 21/552 |
| 2021/0288994 A1* | 9/2021 | Thompson | .......... | H04L 41/0894 |
| 2021/0336985 A1* | 10/2021 | Thompson | ............ | H04L 41/082 |
| 2023/0262072 A1* | 8/2023 | Cambric | ............... | H04L 63/20 726/22 |

OTHER PUBLICATIONS

Peter Mackenzie, "Over-the-Air Fast BSS Transition", Retrieved From http://mackenziewifi.com/index.php/2019/01/02/over-the-air-fast-bss-transition/, Published Jan. 2, 2019 (Year: 2019).*
Admin, "4-Way Handshake", Wifi-Professionals.com, Retrieved From https://www.wifi-professionals.com/2019/01/4-way-handshake, Published Jan. 24, 2019 (Year: 2019).*

* cited by examiner

*Primary Examiner* — Chau Le
(74) *Attorney, Agent, or Firm* — Law Office of Dorian Cartwright; Dorian Cartwright

(57) ABSTRACT

An anomalous behavior is detected at an AI server device based on data communications managed by the wireless controller. In response to the detected behavior, a robot module can be deployed to a location of the anomalous behavior for testing. Once at the location, logs can be collected from testing or troubleshooting at the location and involving a remote access point proximate to the anomalous behavior (e.g., sniff and capture at specific channel or multiple channels in real-time). Solutions are generated from AI analysis concerning the anomalous behavior and priority level, including at least one automatically implemented solution to self-remediate the wireless network.

4 Claims, 4 Drawing Sheets

AI (ARTIFICIAL INTELLIGENCE) DRIVEN DYNAMIC SELF-REMEDIATION FOR WIRELESS NETWORKS BY DISPATCHING ROBOTS

FIELD OF THE INVENTION

The invention relates generally to computer networking, and more specifically, for self-remediation of a wireless network using AI (artificial intelligence).

BACKGROUND

In a typical enterprise deployment setup, administrators have to deal with multiple wireless issues and troubleshoot various deployments and come up with daemon logs, sniffer logs, and the like.

However, the voluminous logs and increasing number of devices connecting to networks make manual operations of networks problematic. It is time consuming to perform all the tasks manually and assign manpower when the issue occurs.

Therefore, what is needed is a robust technique for self-remediation of a wireless network using AI.

SUMMARY

These shortcomings are addressed by the present disclosure of methods, computer program products, and systems for self-remediation of a wireless network using AI.

In one embodiment, anomalous behavior is detected at an AI server device based on data communications managed by the wireless controller. In response to the detected behavior, a robot module can be deployed to a location of the anomalous behavior for testing. Once at the location, logs can be collected from testing or troubleshooting at the location and involving a remote access point proximate to the anomalous behavior (e.g., sniff and capture at specific channel or multiple channels in real-time).

In another embodiment, solutions are generated from AI analysis concerning the anomalous behavior and priority level, including at least one automatically implemented solution to self-remediate the wireless network.

Advantageously, network performance is improved with automated remediations.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for self-remediation of a wireless network using AI.

One of ordinary skill in the art will recognize many additional variations made possible by the succinct description of techniques below.

I. Systems for Wireless Self-Remediation (FIGS. 1-2)

Figure 1:
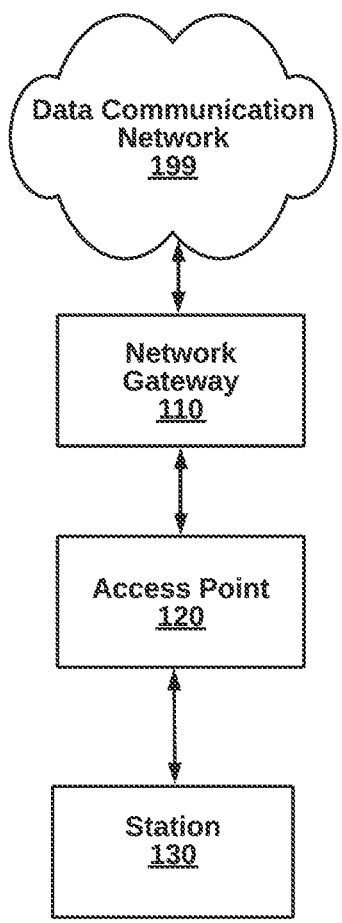
FIG. 1 is a block diagram illustrating a file sharing system for self-remediation of a wireless network using AI, according to an embodiment.
Figure 2:
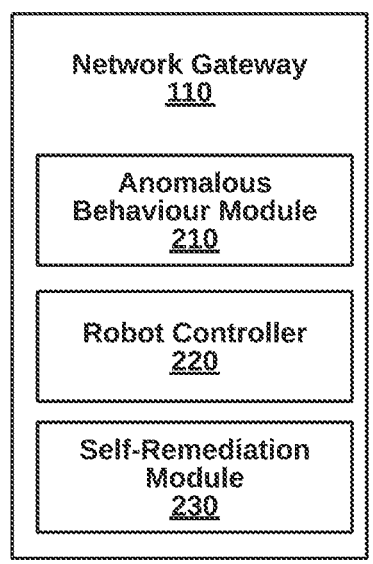
FIG. 2 is a more detailed block diagram illustrating an network gateway of the system of FIG. 1, according to an embodiment.

FIG. 1 is a block diagram illustrating a file sharing system 100 for self-remediation of a wireless network using AI, according to an embodiment. The system 100 includes a self-remediation server 110, an access point 120 and a station 130, coupled to a data communication network 199. Many other configurations are possible, for example, with additional network components such routers, switches, repeaters, firewalls, and the like. Also, there can be many more or fewer clients in FIG. 1. The system components can be implemented in computer devices with non-transitory source code, such as set forth below with reference to FIG. 6.

The components of the system 100 are coupled in communication over the data communication network. The components can be connected to the data communication system via hard wire. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802,11r, and the like.

The self-remediation server 110 deploys robot instances to collect data at remote points on a wireless network. For instance, an indication of potential trouble is triggered by a variety of conditions. In turn, one or more robot instances are deployed to one or more wireless locations to collect logs. The multi-perspective logs can be used to identify a solution. Some solutions are automatically initiated to remediate the network problem using AI or machine learning from past problems and solutions. Other solutions generate logs for a network administrator to handle.

FIG. 2 is a more detailed block diagram illustrating a self-remediation server 110 of the file sharing system of FIG. 1, according to an embodiment. The opportunistic key engine 110 includes an anomalous behavior module 210, a robot controller 220, and a self-remediation module 230. The modules can be implemented in source code stored in non-transitory memory executed by a processor. Alternatively, the modules can be implemented in hardware with microcode. The modules can be singular or representative of functionality spread over multiple components. Many other variations are possible.

The anomalous behavior module 210 can detect anomalous behavior based on data communications managed by the wireless controller (e.g., using AI). In one case, robot instances at remote locations report back data to identify system wide issues. Issues can include connectivity, low throughput, errors, non-human behavior, and the like. A map of the network is discovered or provided. Issue logs also include location information.

The robot controller 220 deploys a robot instance to a location of the anomalous behavior for testing. The robot instances report back to the robot controller 220 and can receive updated tasks. Also, later versions of robots can be sent to the same location with better information for resolving the wireless issue. Logs are collected from the testing or troubleshooting at the location and involving a remote access point proximate to the anomalous behavior (e.g., sniff and capture at specific channel or multiple channels in real-time).

A self-remediation module 230 to generate solutions from AI analysis concerning the anomalous behavior and priority level, including at least one automatically implemented solution to self-remediate the wireless network. For example, if an access point is not broadcasting, one VAP or virtual access point is in config vail state which needs a daemon reset. A local or cloud database of wireless issues is correlated with solutions.

In an embodiment, AI processes in the self-remediation module 230 allow fixes to be learned over time. The initial training can be updated over time.

II. Methods for Wireless Self-Remediation (FIG. 3)

Figure 3:
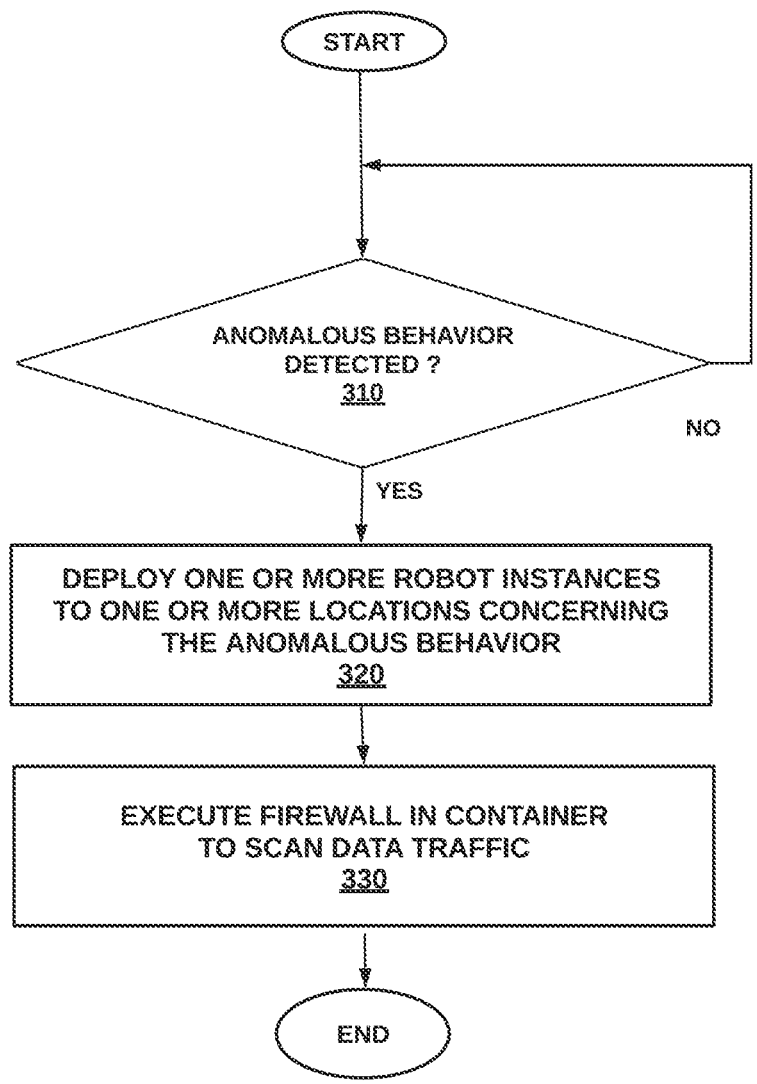
FIG. 3 is a high-level flow diagram illustrating a method for self-remediation of a wireless network using AI, according to one preferred embodiment.

FIG. 3 is a high-level flow diagram illustrating a method for self-remediation of a wireless network using AI, according to one preferred embodiment. The method 300 can be implemented, for example, by the system 100. The steps are merely representative groupings of functionality, as there can be more or fewer steps, and the steps can be performed in different orders. Many other variations of the method 400 are possible.

At step 310, anomalous behavior is detected an AI server device based on data communications managed by the wireless controller. The network is continuously monitored and learning is adapted to look for anomalies.

At step 320, a robot app is deployed to a location of the anomalous behavior for testing.

At step 330, logs are collected from the testing or troubleshooting at the location and involving a remote access point proximate to the anomalous behavior (e.g., sniff and capture at specific channel or multiple channels in real-time)

At step 340, solutions are generated from AI analysis concerning the anomalous behavior and priority level, including at least one automatically implemented solution to self-remediate the wireless.

III. Generic Computing Environment (FIG. 4)

Figure 4:
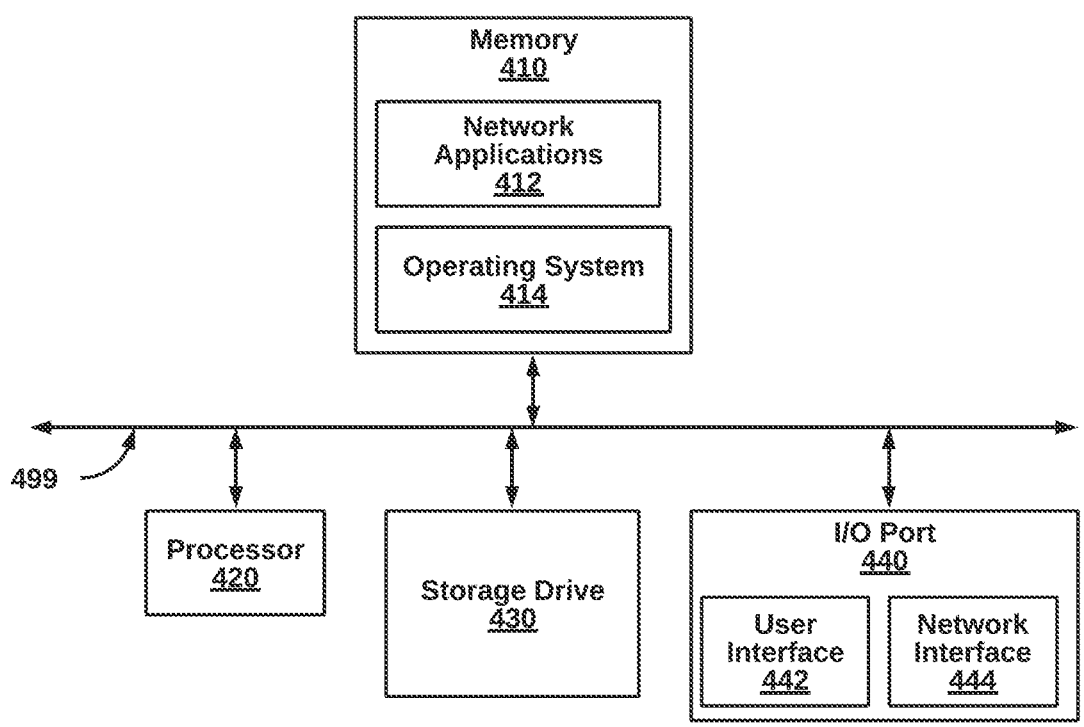
FIG. 4 is a high-level block diagram illustrating a computing device as an example hardware implementation of network devices herein, according to an embodiment.

FIG. 4 is a block diagram illustrating a computing device 400 capable of implementing components of the system, according to an embodiment. The computing device 400, of the present embodiment, includes a memory 410, a processor 420, a storage drive 430, and an I/O port 440. Each of the components is coupled for electronic communication via a bus 499. Communication can be digital and/or analog and use any suitable protocol. The computing device 400 can be any of components of the system 100 (e.g., Wi-Fi controller 110, access point 120, and station 130), other networking devices (e.g., an access point, a firewall device, a gateway, a router, or a wireless station), or a disconnected device.

Network applications 412 (e.g., VM nodes 120A-F) can be network browsers, daemons communicating with other network devices, network protocol software, and the like. An operating system 414 within the computing device 400 executes software, processes. Standard components of the real OS environment 414 include an API module, a process list, a hardware information module, a firmware information module, and a file system. The operating system 414 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The storage drive 430 can be any non-volatile type of storage such as a magnetic disc, EEPROM (electronically erasable programmable read-only memory), Flash, or the like. The storage drive 430 stores code and data for applications.

The I/O port 440 further comprises a user interface 442 and a network interface 444. The user interface 442 can output to a display device and receive input from, for example, a keyboard. The network interface 444 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A network device communicatively coupled to a data communication network with a plurality of stations, for self-remediation of a wireless network using AI (artificial intelligence), the network device comprising:
   a processor;
   a network interface communicatively coupled to the processor and communicatively coupled to exchange data packets over the data communication network; and
   a memory communicatively coupled to the processor and storing:
   an anomalous behavior module to detect anomalous behavior by an AI server device based on data communications managed by the network device;
   a robot controller to deploy a robot app to a remote location on the data communication network of the anomalous behavior for testing;
   wherein the robot controller collects logs from testing or troubleshooting at the location and involving a remote access point proximate to the anomalous behavior; and
   a self-remediation module to generate solutions from AI analysis concerning the anomalous behavior and priority level, including at least one automatically implemented solution to self-remediate the wireless network.

2. The network device of claim 1, wherein the remote location comprises at least one of a remote access point and a remote station.

3. In a network device on a data communication network with a plurality of access points, a method for self-remediation of a wireless network using AI (artificial intelligence), the method comprising the steps of:
   detecting anomalous behavior by an AI server device based on data communications managed by the network device;
   deploying a robot app to a location of the anomalous behavior for testing;
   collecting logs from testing or troubleshooting at the location and involving a remote access point proximate to the anomalous behavior; and
   generating solutions from AI analysis concerning the anomalous behavior and priority level, including at least one automatically implemented solution to self-remediate the wireless network.

4. In a non-transitory computer-readable media in a network device communicatively coupled to a data communication network with a plurality of stations, a method for self-remediation of a wireless network using AI (artificial intelligence), the method comprising the steps of:
   detecting anomalous behavior by an AI server device based on data communications managed by the network device;
   deploying a robot app to a location of the anomalous behavior for testing;
   collecting logs from testing or troubleshooting at the location and involving a remote access point proximate to the anomalous behavior; and
   generating solutions from AI analysis concerning the anomalous behavior and priority level, including at least one automatically implemented solution to self-remediate the wireless network.

* * * * *